US012195887B2

(12) United States Patent
Neumüller et al.

(10) Patent No.: US 12,195,887 B2
(45) Date of Patent: Jan. 14, 2025

(54) FABRIC WEB MATERIAL AND METHOD FOR THE PRODUCTION THEREOF

(71) Applicant: Starlinger & Co Gesellschaft m.b.H., Vienna (AT)

(72) Inventors: Norbert Neumüller, Weissenbach/Triesting (AT); Michael Doppler, Draßmarkt (AT); Walter Schwarzenecker, Alland (AT); Niklas Pölleritzer, Furth a. d. Triesting (AT)

(73) Assignee: Starlinger & Co Gesellschaft m.b.H., Vienna (AT)

( * ) Notice: Subject to any disclaimer, the term of this patent is extended or adjusted under 35 U.S.C. 154(b) by 916 days.

(21) Appl. No.: 17/284,915

(22) PCT Filed: Nov. 6, 2019

(86) PCT No.: PCT/EP2019/080412
§ 371 (c)(1),
(2) Date: Apr. 13, 2021

(87) PCT Pub. No.: WO2020/094727
PCT Pub. Date: May 14, 2020

(65) Prior Publication Data
US 2021/0381136 A1 Dec. 9, 2021

(30) Foreign Application Priority Data
Nov. 7, 2018 (EP) .................................... 18204928

(51) Int. Cl.
*D03D 1/04* (2006.01)
*B31B 70/18* (2017.01)
(Continued)

(52) U.S. Cl.
CPC ............... *D03D 1/04* (2013.01); *B31B 70/18* (2017.08); *B65D 29/00* (2013.01); *B31B 2155/003* (2017.08); *D03D 15/46* (2021.01)

(58) Field of Classification Search
CPC .............. B31B 70/18; B31B 2155/003; B31B 2155/0012; B31B 70/14; B31B 70/16;
(Continued)

(56) References Cited

U.S. PATENT DOCUMENTS 2,217,494 A 10/1940 Poppe
5,198,276 A * 3/1993 Nakajima .......... B65D 75/5805 428/43
(Continued)

FOREIGN PATENT DOCUMENTS

| | | | |
|---|---|---|---|
| EP | 3081374 | A1 | 10/2016 |
| EP | 3299312 | A1 | 3/2018 |
| WO | 2008/095212 | A1 | 8/2008 |

OTHER PUBLICATIONS

International Search Report and Written Opinion, ISA/EP, English Translation for PCT/EP2019/080412 filed Nov. 6, 2019, mailed Feb. 11, 2020.

*Primary Examiner* — Jennifer A Gillett
(74) *Attorney, Agent, or Firm* — Workman Nydegger

(57) ABSTRACT

A web material made of a woven fabric is divided into web sections by tear lines. The tear lines weaken the web material without causing a complete separation of the web sections from the web material. The web sections are separable from the web material by being torn off along the tear lines. Cuts are formed in the woven fabric along transverse sections of each tear line, the transverse sections running essentially transversely to the longitudinal extension of the web material, which cuts are spaced apart from each other and are oriented in the longitudinal direction of the web material or
(Continued)

transversely to the transverse section of the tear line, with the cuts being connected to only one transverse section of the tear line.

16 Claims, 1 Drawing Sheet

(51) Int. Cl.
*B31B 155/00* (2017.01)
*B65D 30/00* (2006.01)
*D03D 15/46* (2021.01)
(58) Field of Classification Search
CPC ........ B31B 70/20; B65D 29/00; B65D 33/00; B65D 31/12; B26D 3/08; B26D 3/085
See application file for complete search history.

(56) References Cited

U.S. PATENT DOCUMENTS

| | | | | |
|---|---|---|---|---|
| 5,616,387 | A * | 4/1997 | Augst | A61F 13/0273 428/354 |
| 5,795,834 | A * | 8/1998 | Deeb | B32B 27/308 428/354 |
| 2012/0211537 | A1* | 8/2012 | Skopek | B31B 70/00 225/2 |

* cited by examiner

FABRIC WEB MATERIAL AND METHOD FOR THE PRODUCTION THEREOF

The invention relates to a process for the production of a web material formed from a woven fabric as well as a web material made of a woven fabric and a sack produced therefrom.

Web materials made of woven fabrics, which are formed from interwoven tapes, in particular plastic tapes, are commonly known. The web materials are divided into web sections by tear lines extending across the width of the web material, with the tear lines weakening the web material without causing a complete separation of the web sections from the web material, but rather constituting predetermined breaking points at which the web sections can be separated from the web material by being torn off along the tear lines, with an appropriate force being applied. The tear lines run through the woven fabric either in a straight line or in a curved fashion essentially in the transverse direction to the longitudinal extension of the web material or have a stepped configuration in which the tear lines run through the woven fabric while being composed of transverse sections and longitudinal sections. Web materials wherein the tear lines are introduced into the woven fabric by means of laser are known, for example, from WO 2008/095212 A1.

Due to manufacturing inaccuracies, it is not unlikely that tapes running through the woven fabric essentially transversely to a longitudinal extension of the web material—also referred to as weft tapes—and the tear lines will run diagonally to each other. It may happen as a result that weft tapes become unthreaded from the woven fabric when web sections are torn from the web material at the tear lines, which weft tapes will then protrude from the web sections. If the web sections have a tubular design, they are usually processed further into sacks. However, customers are reluctant to accept sacks with protruding tapes, since many customers associate protruding tapes, accompanied by an unsightly appearance of the sacks, with sacks of a low quality, although the function of the sacks is not impaired thereby.

Although it is possible to coat the web sections with a further material layer, such as an OPP (Oriented Polypropylene) film, in order to reduce the likelihood of tapes becoming unthreaded during the tearing-off process, such an additional coating is expensive and therefore not always desirable.

It is therefore the object of the present invention to provide a web material and a process for the production of such a web material which avoids the disadvantages of the prior art and from which web sections can be torn without individual tapes sticking out to a noteworthy degree.

According to the invention, the object is achieved by a process for the production of a web material having the features of claim 1 and by providing a web material having the features of claim 10 as well as a sack formed therefrom. Preferred embodiments of the invention are a subject matter of the dependent claims and the specification.

By means of the process according to the invention, a web material formed from a woven fabric can be produced, wherein the web material is divided into web sections by tear lines extending across the width of the web material and wherein the tear lines weaken the web material without causing a complete separation of the web sections from the web material, but the web sections are separable from the web material by being torn off along the tear lines, by the application of tensile forces. Each tear line has at least one transverse section running entirely or at least predominantly transversely to the longitudinal extension of the web material. In accordance with the process according to the invention, cuts are introduced into the woven fabric at the at least one transverse section of the tear line, which cuts are spaced apart from each other and are oriented in the longitudinal direction of the web material or transversely to the transverse section of the tear line, with at least some of the cuts being connected to only one transverse section.

The term "transverse section of the tear line running transversely or at least predominantly transversely to the longitudinal extension of the web material" is supposed to mean that said transverse section extends in a straight or curved line or in a combination of straight or curved lines. "Transverse section running transversely to the longitudinal extension of the web material" means that such a transverse section runs essentially (i.e., apart from unavoidable manufacturing and material tolerances) at an angle of 90° to the longitudinal extension of the material web. The term "transverse section running predominantly transversely to the longitudinal extension of the web material" defines that the transverse section in its entirety runs rather more transversely to the longitudinal extension of the web material than in the longitudinal extension of the web material. That is, if such a transverse section is a straight line which is inclined on the longitudinal extension of the web material, this oblique line is located relative to the longitudinal extension of the web material in an angular range greater than 45° and smaller than 90°. If such a transverse section consists of a curved line or a combination of straight and/or curved line pieces, a tangent at any point in the transverse section is supposed to have an angular range greater than 45° and smaller than 90° relative to the longitudinal extension of the web material.

Due to the fact that, in accordance with the process according to the invention, cuts are introduced into the woven fabric at the at least one transverse section of the tear line, which cuts are spaced apart from each other and are oriented in the longitudinal direction of the web material or transversely to the transverse section of the tear line, with at least some of the cuts being connected to only one transverse section, said cuts subdivide at least the tape extending closest to the tear line into individual pieces, optionally also several of the tapes extending closest to the tear line. In case of a tubular woven fabric produced by a circular loom, the subdivided tapes are the weft tapes of the woven fabric. Due to the subdivision, those parts of the tape(s) which possibly become unthreaded when web sections are torn from the web material are only very short, as a result of which they do not stick out in an unsightly manner. The optical appearance of the web sections after the web material has been torn off is thereby improved.

If the tear line is just a straight line all across the tape material, this tear line consists of a single transverse section. In the case that the tear line is a stepped line, e.g., for the production of stepped gusseted sacks, this tear line has at least two transverse sections and one longitudinal section connecting the transverse sections. However, it is to be noted that such a longitudinal section must not be confused with the cuts according to the invention at the transverse sections of the tear lines, since those cuts have a completely different function than the longitudinal sections of the tear line. An essential feature of the cuts according to the invention at the transverse sections of the tear line is that they do not connect two adjacent transverse sections of the tear line with each other.

According to an embodiment of the invention, the cuts are introduced into the woven fabric in such a way that the cuts will extend only in one of two adjacent web sections.

Alternatively, however, the cuts can also be introduced into the woven fabric according to the invention in such a way that the cuts will extend on both sides of a tear line in adjacent web sections. In the latter variant, tapes are prevented from sticking out both at the end of one web section and at the end of another web section.

The cuts are advantageously introduced into the woven fabric across a length of at least one tape width. A length of one tape width is necessary in case of cuts which extend in only one of two web sections divided by a tear line in order to reliably sever a tape located closest to the tear line and to prevent the tape from sticking out. If the cuts are introduced into the woven fabric in such a way that the cuts will extend in both web sections divided by a tear line, the cuts will advantageously have a length of at least two tape widths.

Suitably, the cuts are introduced into the woven fabric at a distance of four to ten tape widths from one another. The smaller the chosen distance, the shorter the pieces of tape sticking out.

The cuts are preferably introduced into the woven fabric by means of a laser, a mechanical cutting device or a punching device. The cuts of a tear line are either introduced into the web material already before the web material is provided with the tear line, or, alternatively, while the web material is provided with the tear line or only after the web material has been provided with the tear line.

The web material according to the invention is advantageously formed by a woven fabric shaped into a tube, with tube pieces torn from the web material being shaped into a sack, such as, for example, a so-called "pinch bottom" sack for bulk material. By preventing long tapes that are sticking out, such sacks have a high-quality appearance and are therefore very well received.

The woven fabric is preferably formed by interwoven tapes made of polyethylene, polypropylene and/or polyethylene terephthalate.

The web material may also comprise two or more layers of material, wherein at least one material layer is a woven fabric. Advantageously, at least one of the material layers of the web material is formed from polyethylene, polypropylene or polyethylene terephthalate.

Further advantageous embodiments of the process according to the invention and of the web material according to the invention are explained in further detail below with reference to the figures.

Figure 1:
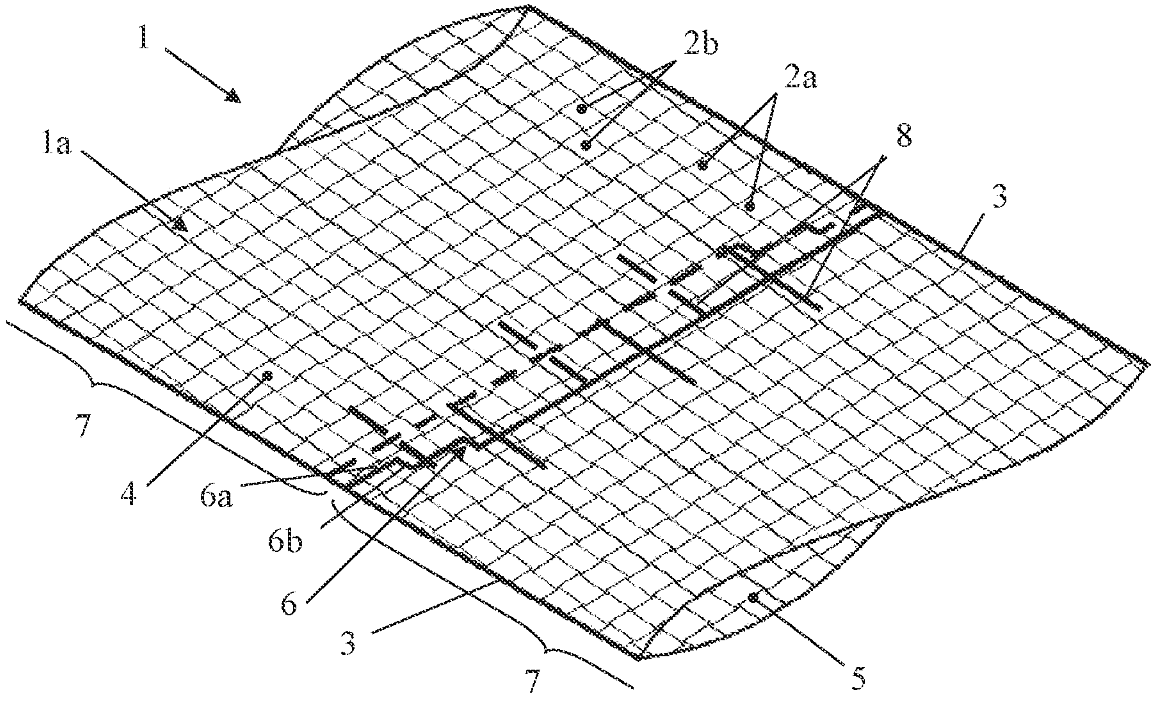
FIG. 1 shows a first embodiment of the web material according to the invention in sections in an isometric view.

First, reference is now made to FIG. 1, which shows a first embodiment of a web material 1 according to the invention in sections in an isometric view. The web material 1 is formed from a woven fabric 1*a* shaped into a tube and produced, for example, in a circular loom. The woven fabric 1*a* is formed from interwoven tapes 2*a* (weft tapes) and 2*b* (warp tapes). The tubular web material 1 is laid flat, whereby two edges 3 and an upper side 4 and a lower side 5 are formed.

The web material 1 has tear lines 6 which are formed in the web material 1 at a distance from one another and define web sections 7 of a length corresponding to the distance between adjacent tear lines 6. If the web material serves for the production of sacks, the web sections 7 form sack bodies, and the length of the web sections defines the length of the sack body. For reasons of simplification, only one tear line 6 is shown in FIG. 1. The tear line 6 runs around the tubular web material 1 in a stepped manner, the tear line 6 being illustrated as a dashed line on the lower side 5. As can be seen in FIG. 1, the tear line 6 runs differently on the lower side 5 compared to the upper side 4.

The tear line 6 is designed so as to be stepped in order to form stepped gusseted sacks from the web sections and comprises a plurality of transverse sections 6*a* interconnected by longitudinal sections 6*b*. The transverse sections 6*a* of the tear line 6 run essentially transversely to the longitudinal extension of the web material 1. The longitudinal sections 6*b* of the tear line 6 run essentially in the direction of the longitudinal extension of the web material.

The tear lines 6 divide the tubular web material 1 into adjacent or, respectively, oppositely located web sections 7, with the tear lines 6 weakening the web material 1 without causing a complete separation of the web sections 7 from the web material 1. By applying an appropriate force onto the web material 1, web sections 7 can be separated from the web material 1 along the tear line 6 by being torn off.

According to the invention, cuts 8 spaced apart from each other are formed in the woven fabric la at the transverse sections 6*a* of the tear line 6, these cuts 8 extending in the longitudinal direction of the web material 1 or transversely to the transverse sections 6*a* of the tear line 6. The cuts 8 are each connected to only one of the transverse sections 6*a* of the tear line 6, i.e., they do not serve for connecting adjacent transverse sections 6*a* to each other. Rather, such a connection is exclusively the task of the longitudinal sections 6*b* of the tear line 6. In this embodiment, the cuts 8 extend in both web sections 7 divided by the tear line 6.

The cuts 8 are formed in the web material 1 across a length of approximately three tape widths and with a mutual spacing of five to six tape widths along the transverse sections 6*a* of the tear line 6 in the woven fabric 1*a*.

The cuts 8 divide at least those tapes 2*a* into individual pieces which run closest to the tear line 6. As a result of this division, those sections of the tape 2*a* which possibly become unthreaded from the web material 1 when web sections 7 are being torn off are limited in terms of their length. Hence, only short sections of tapes 2, if any, can stick out after the tearing-off process. As a result, the optical appearance of the web sections 7 after they have been torn from the web material 1 is improved.

Figure 2:
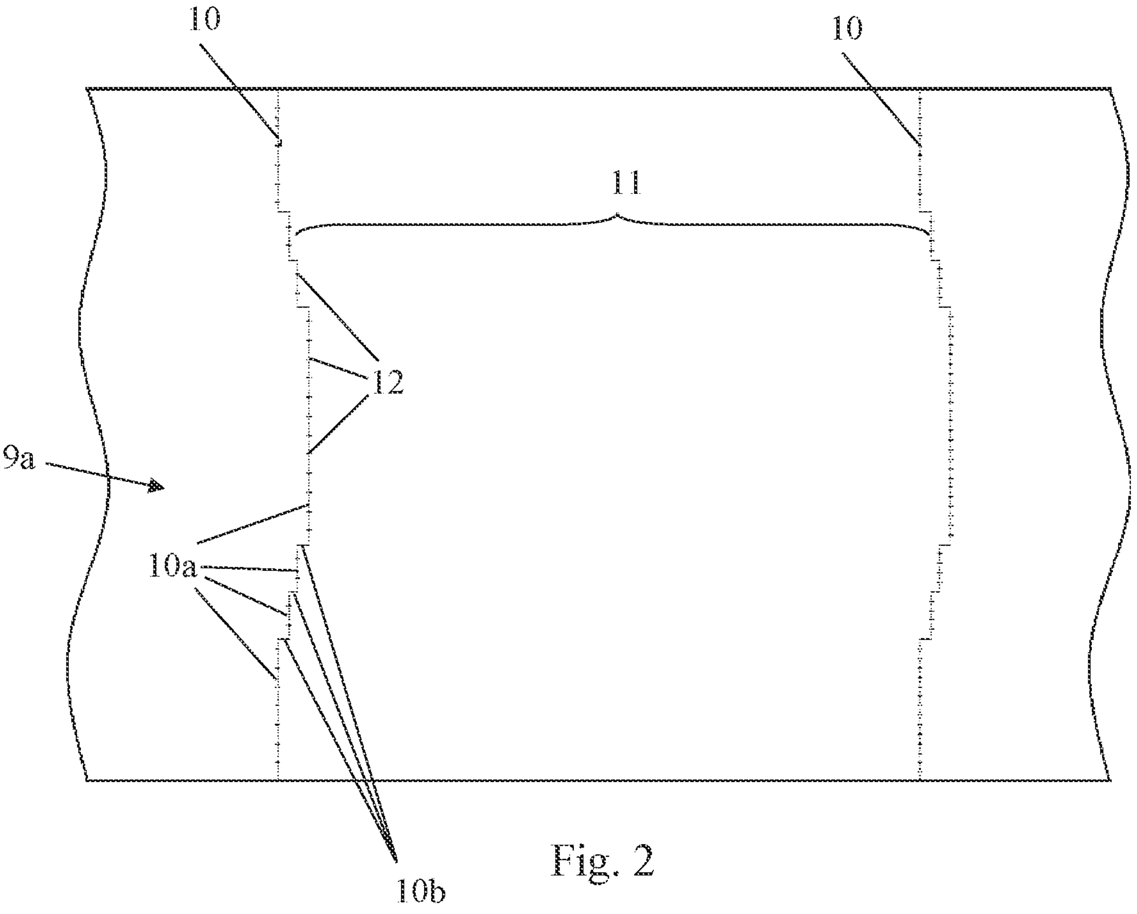
FIG. 2 shows a further embodiment of the web material according to the invention in sections in a plan view.

FIG. 2 shows a further embodiment of the web material 9 according to the invention in sections in a schematic plan view. The web material 9 is formed from a flat woven fabric 9*a*, the woven fabric 9*a* being formed from interwoven tapes. During further processing, this flat woven fabric is shaped into a tube. For clarity, the woven fabric 9*a* is not depicted in detail in FIG. 2. In FIG. 2, the tubular web material 9 lies flat on a support.

The web material 9 is divided into web sections 11 by tear lines 10. In this embodiment variant, too, the tear lines 10 only weaken the web material 9, but do not cause a complete separation of the web sections 11. As can be seen clearly in FIG. 2, the tear lines 10 run through the woven fabric in a stepped manner also in this embodiment and each have a plurality of transverse sections 10*a* interconnected by longitudinal sections 10*b*. The transverse sections 10*a* of the tear lines 10 run essentially transversely to the longitudinal extension of the web material 9. The longitudinal sections 10*b* of the tear lines 10 run essentially in the direction of the longitudinal extension of the web material 9. The web sections 11 can be separated from the web material 9 by being torn off along the tear lines 10.

Cuts 12 spaced apart from each other are formed in the woven fabric 9*a* along the transverse sections 10*a* of the tear lines 10, these cuts 12 extending in the longitudinal direction of the web material 9 or transversely to the transverse sections 10*a* of the tear lines 10. The cuts 12 are each connected to only one of the transverse sections 10*a* of the tear lines 10, i.e., they do not serve for connecting adjacent transverse sections 10*a* to each other. Such a connection is exclusively the task of the longitudinal sections 10*b* of the tear lines 10. The cuts 12 each extend in both web sections 11 located opposite to each other on a tear line 10.

In the web material 9, the cuts 12 are formed across a length of four to five tape widths and with a spacing of eight to ten tape widths along the transverse sections 10*a* of the tear lines 10 in the woven fabric 9*a*.

Similarly to the embodiment of the web material 1 as illustrated in FIG. 1, in this embodiment, too, the tapes extending closest to the tear line 10 are divided, whereby only short sections of tapes—if any—become unthreaded when web sections 11 are being torn off. As a result, the optical appearance of the web sections 11 after they have been torn from the web material 9 is improved.

It should be mentioned that the course of the tear lines 6 and 10, respectively, is determined according to the further use of the web sections 7 and 10, respectively. Furthermore, it should be indicated that the cuts 8 and 12, respectively, can also be formed obliquely to the respective tear lines 6 and 10 in the woven fabric, or some cuts 8 and 12, respectively, can be formed transversely and some cuts 8 and 12, respectively, can be formed obliquely to the respective tear lines 6 and 10 in the woven fabric.

Sacks for loose material can, for example, be folded from the web sections 7 and 10, respectively, wherein the woven fabric can be coated. However, there is also the possibility that the web material 1 or 9 comprises only the woven fabric 1*a*, 9*a* and the web sections are supplied to another use.

The invention claimed is:

1. A process for the production of a web material formed from a woven fabric, wherein the woven fabric is formed from interwoven tapes, the method comprising:

dividing the web material into web sections by forming tear lines that extend across the width of the web material, wherein the tear lines weaken the web material without causing a complete separation of the web sections from the web material, and the web sections are separable from the web material by being torn off along the tear lines, wherein each tear line has at least one transverse section running transversely or at least predominantly transversely to the longitudinal extension of the web material; and forming cuts in the woven fabric at the at least one transverse section of each of the tear lines, wherein the cuts of each of the tear lines are spaced apart from each other and are oriented in the longitudinal direction of the web material or transversely to the transverse sections of the tear lines, wherein each of the cuts is connected to only one transverse section.

2. A process according to claim 1, further comprising forming the cuts into the woven fabric in such a way that the cuts extend only in one of two web sections located opposite to each other on a tear line.

3. A process according to claim 1, further comprising forming the cuts into the woven fabric in such a way that the cuts extend in both web sections located opposite to each other on a tear line.

4. A process according to claim 1, further comprising forming the cuts into the woven fabric across a length of at least one tape width.

5. A process according to claim 1, further comprising forming the cuts into the woven fabric at mutual spacings of four to ten tape widths.

6. A process according to claim 1, further comprising forming the cuts into the woven fabric by means of a laser, a mechanical cutting device or a punching device.

7. A process according to claim 1, wherein the woven fabric is formed by interwoven tapes made of polyethylene, polypropylene and/or polyethylene terephthalate.

8. A web material made of a woven fabric formed from interwoven tapes, the web material comprising:

tear lines extending across the width of the web material, wherein the tear lines are formed in the web material at a distance from one another and divide the web material into web sections, wherein the tear lines weaken the web material without causing a complete separation of the web sections from the web material, and the web sections are separable from the web material by being torn off along the tear line, wherein each tear line includes at least one transverse section running transversely or at least predominantly transversely to the longitudinal extension of the web material; and cuts that are formed in the woven fabric at the at least one transverse section of each of the tear lines, wherein the cuts are spaced apart from each other and are oriented in the longitudinal direction of the web material or transversely to the transverse section of the tear line, wherein the cuts are connected to only one transverse section in each of the tear lines.

9. A web material according to claim 8, wherein the cuts are formed in the woven fabric in such a way that the cuts will extend only in one of two web sections located opposite to each other on a tear line.

10. A web material according to claim 8, wherein the cuts are formed in the woven fabric in such a way that the cuts will extend in both web sections located opposite to each other on a tear line.

11. A web material according to claim 8, wherein the cuts are formed in the woven fabric across a length of at least one tape width.

12. A web material according to claim 8, wherein the cuts are formed in the woven fabric at mutual spacings of four to ten tape widths.

13. A web material according to claim 8, wherein the tapes are formed from polyethylene, polypropylene or polyethylene terephthalate.

14. A sack, wherein the sack is formed from a web section of a web material according to claim 8.

15. A process according to claim 1, wherein the woven fabric is formed from interwoven plastic tapes.

16. A web material according to claim 8 wherein the woven fabric is formed from interwoven plastic tapes.

* * * * *